US010330022B2

(12) United States Patent
Singh et al.

(10) Patent No.: US 10,330,022 B2
(45) Date of Patent: Jun. 25, 2019

(54) SYSTEMS AND METHODS FOR DETERMINING OPERATIONAL IMPACT ON TURBINE COMPONENT CREEP LIFE

(71) Applicant: General Electric Company, Schenectady, NY (US)

(72) Inventors: Anshuman Singh, Greenville, SC (US); John Robert Korsedal, Greenville, SC (US); Jenfu Yau, Greenville, SC (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 15/043,008

(22) Filed: Feb. 12, 2016

(65) Prior Publication Data
US 2017/0234241 A1    Aug. 17, 2017

(51) Int. Cl.
*F02C 9/24* (2006.01)
*G05B 13/04* (2006.01)
*G05B 23/02* (2006.01)

(52) U.S. Cl.
CPC .............. *F02C 9/24* (2013.01); *G05B 13/048* (2013.01); *G05B 23/0205* (2013.01); *G05B 23/0254* (2013.01); *G05B 23/0283* (2013.01)

(58) Field of Classification Search
CPC ........................................................ F02C 9/24
USPC ........................................................ 700/287
See application file for complete search history.

(56) References Cited

U.S. PATENT DOCUMENTS

| 5,042,295 | A   | 8/1991  | Seeley |
| 6,336,083 | B1  | 1/2002  | Lanham et al. |
| 7,197,430 | B2  | 3/2007  | Jacques et al. |
| 2006/0265183 | A1 | 11/2006 | Jacques et al. |
| 2014/0244133 | A1* | 8/2014 | De Prosperis ..... G05B 23/0208 701/100 |
| 2016/0026739 | A1 | 1/2016 | Seema et al. |

FOREIGN PATENT DOCUMENTS

| EP | 1722072      | 11/2006 |
| EP | 2541145      | 2/2013  |
| EP | 2862032      | 12/2013 |
| WO | WO1997038292 | 10/1997 |
| WO | WO2009155591 | 12/2009 |
| WO | WO2012160371 | 11/2012 |
| WO | WO2013014202 | 1/2013  |

\* cited by examiner

*Primary Examiner* — Anthony Ho
(74) *Attorney, Agent, or Firm* — Fletcher Yoder, P.C.

(57) ABSTRACT

A system includes a controller configured to control an operation of a turbine system, and an analytics system coupled to the controller and configured to receive inputs corresponding to the operation of the turbine system, generate an operational impact factor (OIF) value based at least in part on the inputs, generate a turbine system life prediction model configured to predict an operating life of one or more components of the turbine system based at least in part on the OIF value, and provide the OIF value to the controller to perform an action based thereon.

18 Claims, 8 Drawing Sheets

SYSTEMS AND METHODS FOR DETERMINING OPERATIONAL IMPACT ON TURBINE COMPONENT CREEP LIFE

BACKGROUND

The invention relates generally to turbine systems, and more specifically to systems and methods for determining operational impact on component creep life in turbine systems.

Various techniques may be used for assessing remaining useful life of power plant components such as, for example, components of gas turbines within power plant environments. Generally, each turbine component operating under certain conditions may experience a change in the state of stress due to "creep," even if the certain operating conditions (e.g. temperature, applied force) remain constant. Moreover, any conversion of elastic strain to inelastic strain, which may be due to "creep," may result in a reduction in stress. For example, certain conversions may include relaxation of high local stresses in areas of stress concentrations, stresses in thread root of a bolt, relaxation of displacement controlled stresses, thermal stresses, and nominal axial stress in a bolt. Indeed, because the useful life of a gas turbine component may not be a single design point, but may instead be a distribution that may be affected by the operation conditions, accurately predicting potential creep ruptures and/or the exceeding of operational limits of gas turbine components may be elusive. Accordingly, it may be useful to provide techniques to determine the remaining useful life of gas turbine components.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes a controller configured to control an operation of a turbine system, and an analytics system coupled to the controller and configured to receive inputs corresponding to the operation of the turbine system, generate an operational impact factor (OIF) value based at least in part on the inputs, generate a turbine system life prediction model configured to predict an operating life of one or more components of the turbine system based at least in part on the OIF value, and provide the OIF value to the controller to perform an action based thereon.

A non-transitory computer-readable medium having code stored thereon, the code includes instructions to cause an analytics system to receive inputs corresponding to an operation of the turbine system, cause the analytics system generate an operational impact factor (OIF) value based at least in part on the inputs, cause the analytics system generate a turbine system life prediction model configured to predict an operating life of one or more components of the turbine system based at least in part on OIF value, and provide the OIF value to a controller to perform an action based thereon.

A system includes a data analytics system configured to generate a linear damage rate value based on one or more operating parameters of gas turbine system, and to generate a physics-based gas turbine system life prediction model based at least in part on the linear damage rate. The physics-based gas turbine system life prediction model is configured to predict an operating life of a component of the gas turbine system.

DRAWINGS

These and other features, aspects, and advantages of the present invention will become better understood when the following detailed description is read with reference to the accompanying drawings in which like characters represent like parts throughout the drawings, wherein.

Figure 6:
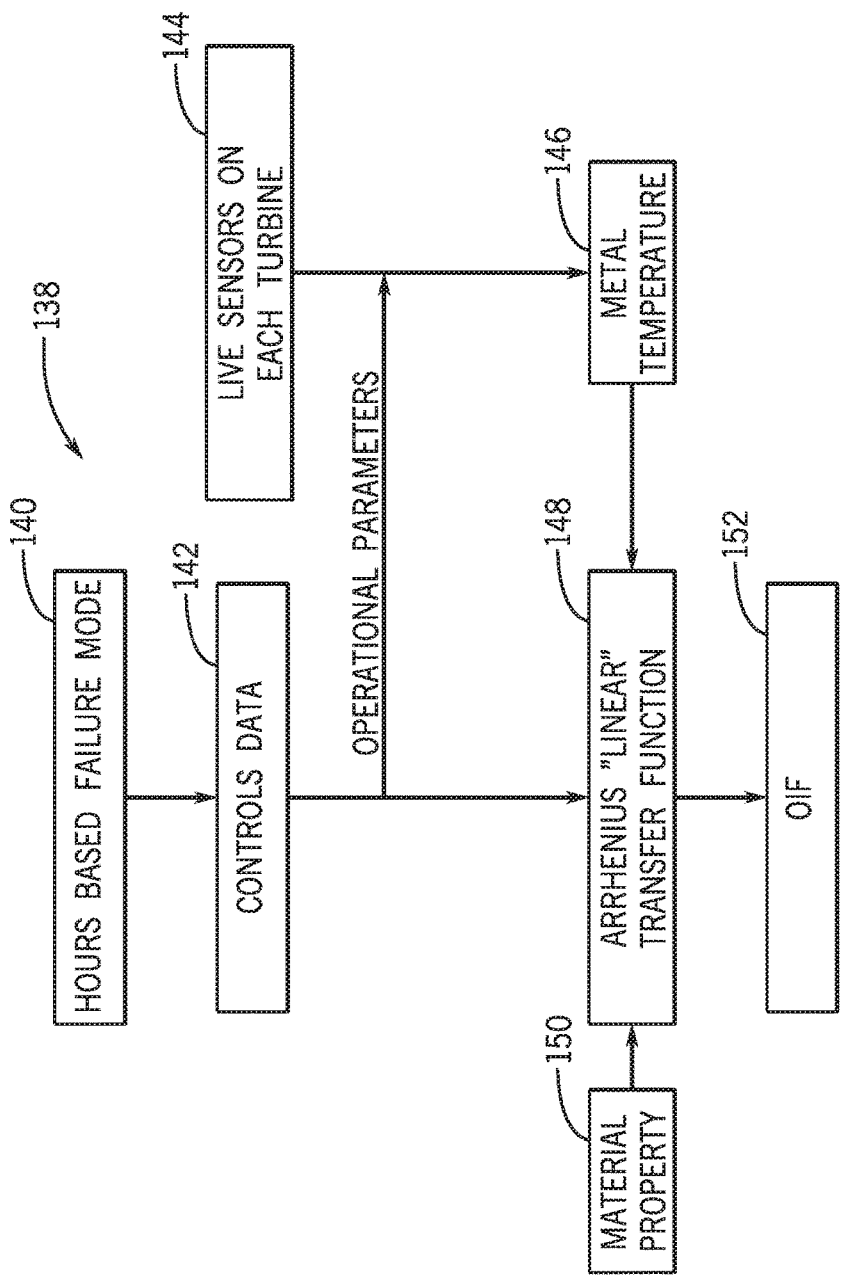
Figure 7:
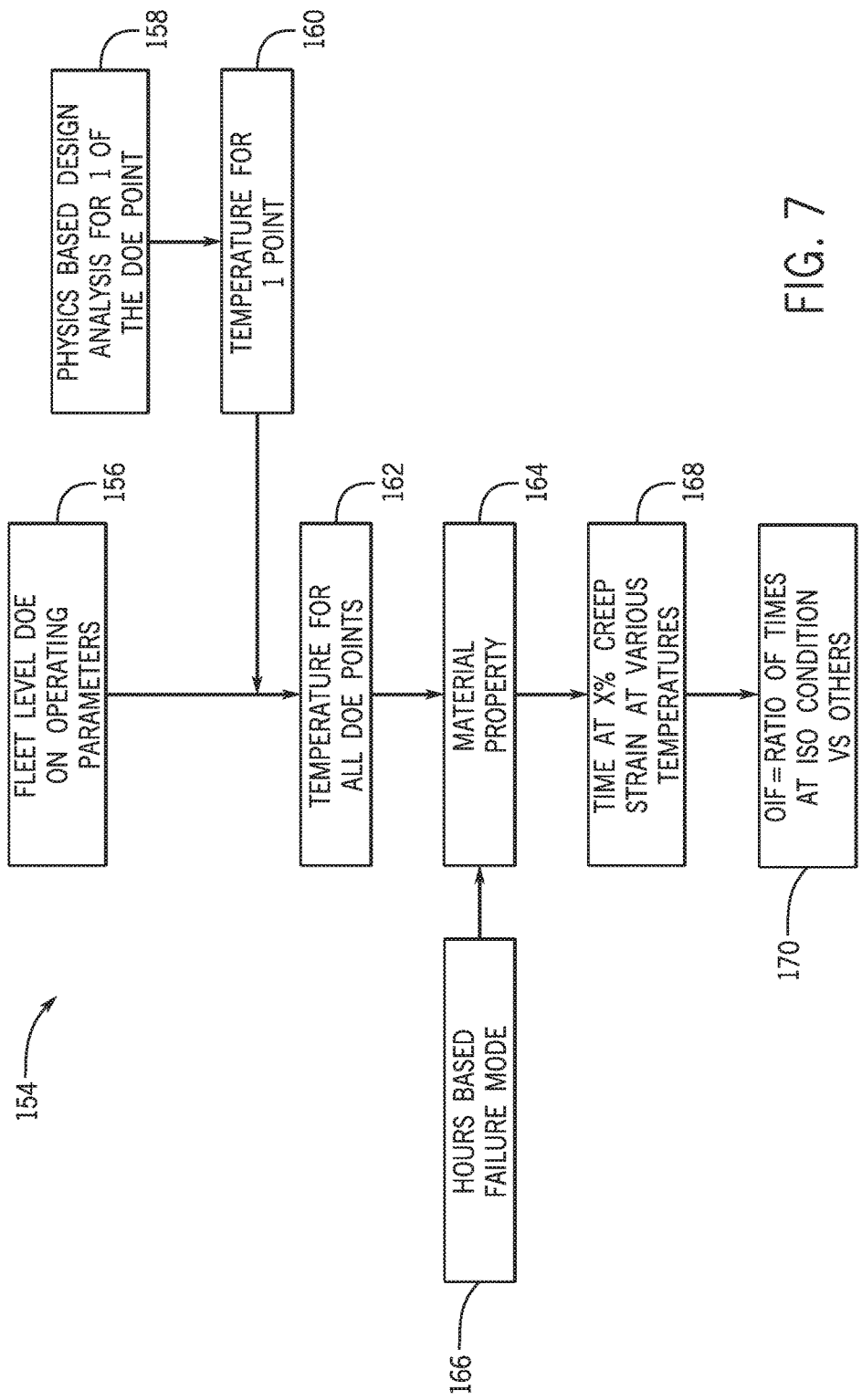

FIG. 6 is another flowchart illustrating another embodiment of a process useful in predicting and modeling potential creep ruptures of gas turbine components including component metal temperature data for each turbine, in accordance with an embodiment; and FIG. 7 is another flowchart illustrating another embodiment of a process useful in predicting and modeling potential creep ruptures of gas turbine components including a physics-based design analysis of DOE parameters, in accordance with an embodiment.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods relate to an analytics system that may predict and model potential creep ruptures of gas turbine or other industrial system components (e.g., turbine blades, stator blades, shaft, compressor, nozzles, burners, exhaust section, valves, actuators, and so forth). For example, the analytics system may model variations in gas turbine system operations reflected by distribution of temperatures converted into a linear damage rate (which may be referred to as operational impact factor ("OIF")) for specified time ranges based on, for example, physics based model outputs and one or more transfer functions. In certain embodiments, the analytics system may calculate a factored run time (e.g., factored run time that is specific to how that particular gas turbine was run) for all the tours to compute cumulative damage at the component level. The analytics system may then associate damage with field creep ruptures and non-creep ruptures to determine a statistical correlation. The analytics system may then utilize the statistical models to predict the probability for potential creep ruptures at any given time. In some embodiments, the generated damage approximation value may be used to identify, for example, a highly worked gas turbine system, and may drive the decisions for preventative maintenance schedules and repair scope, outage planning, repair planning, and fallout (e.g., part scrap) predictions. In this way, the analytics system may predict the probability of potential gas turbine component creep rupture expected before an outage, and thus outage planning (e.g., power plant outage planning and scheduling, a given preventative maintenance action, and predicting the part condition and necessary repair scope at that outage date), prescribing the manner in which the gas turbine may be operated to a preventative maintenance action, predicting the amount fall-out expected, improving repair planning and so forth. As used herein, a "creep" may, in some embodiments, refer to a time-dependent deformation at an elevated temperature and/or constant stress. Similarly, a "creep rupture" may, in some embodiments, refer to a failure or a potential failure of one or more systems or components resulting from an adverse "creep" condition.

Figure 1:
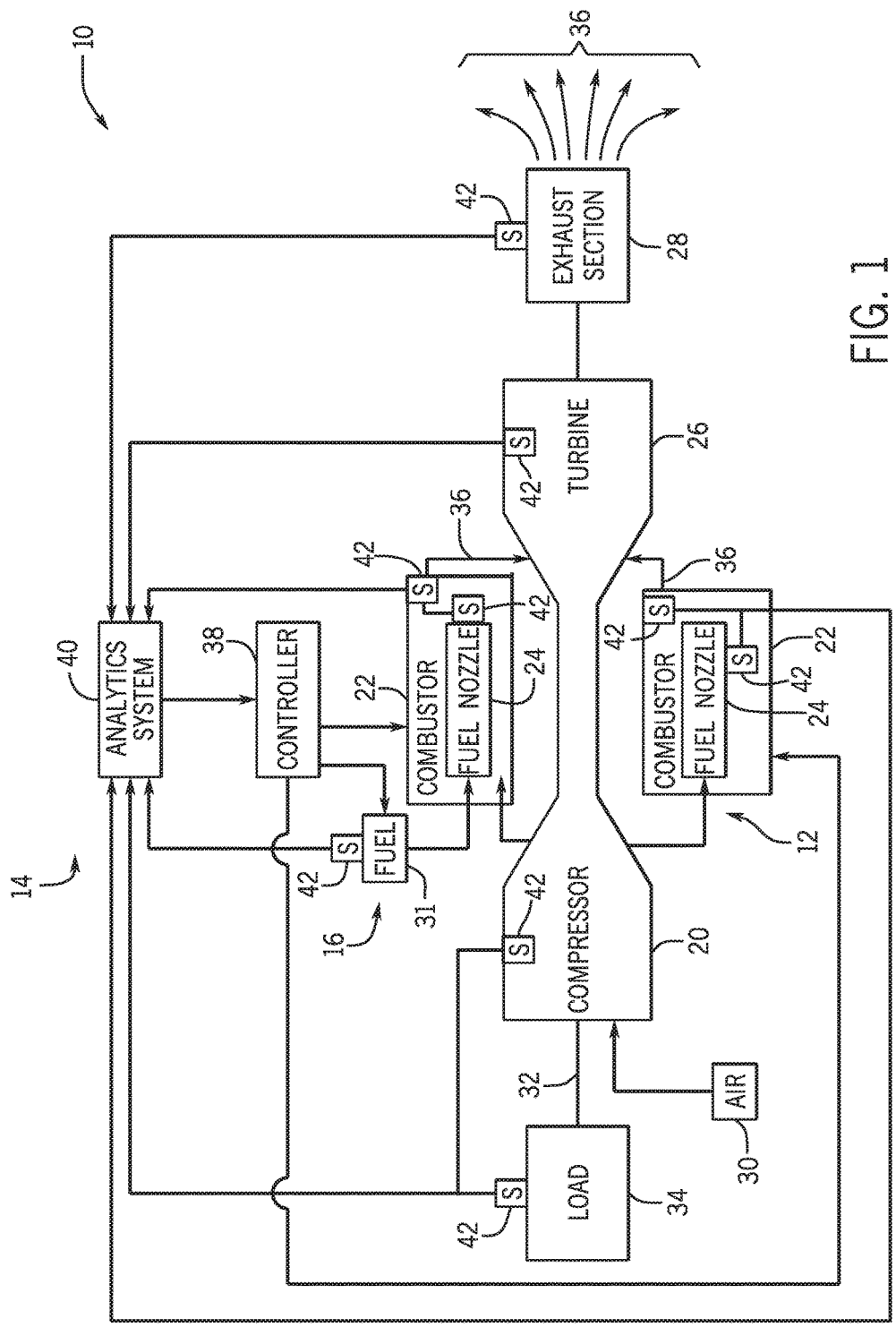
FIG. 1 is a block diagram of an embodiment of a gas turbine system including a combustion system, in accordance with an embodiment.

With the foregoing in mind, it may be useful to describe an embodiment of an industrial system, such as an example gas turbine system 10 illustrated in FIG. 1. In certain embodiments, the gas turbine system 10 may include a gas turbine system 12, a control system 14, and a fuel supply system 16. As illustrated, the gas turbine system 12 may include a compressor 20, combustion chambers 22, fuel nozzles 24, a turbine 26, and an exhaust section 28. During operation, the gas turbine system 12 may take in air 30 into the compressor 20. The compressor 20 may then compress and move the air 30 to the combustion chambers 22 (e.g., chambers including a number of combustors or burners).

In certain embodiments, the combustion chambers 22, using the fuel nozzles 24, may take in fuel 31 that mixes with the now compressed air 30 creating an air-fuel mixture. The air-fuel mixture may combust within the combustion chambers 22 to generate hot combustion gases, which flow downstream into the turbine 26 to drive the turbine 26. For example, the combustion gases may move through the turbine 26 to drive one or more stages of blades of the turbine 26, which may in turn drive rotation of a shaft 32.

The shaft 32 may connect to a load 34, which may include, for example, a generator to convert the output of the shaft 32 into electric power. In certain embodiments, upon passing through the turbine 26, the hot combustion gases may vent into the environment as exhaust gases 36 via the exhaust section 28. The exhaust gas 36 may include major species such as, for example, carbon dioxide ($CO_2$), nitrogen ($N_2$), water vapor ($H_2O$), and oxygen ($O_2$), as well as minor species (e.g., pollutants) such as, for example, carbon monoxide (CO), nitrogen oxides ($NO_x$), unburned hydrocarbons (UHC), and sulfur oxides ($SO_x$).

In certain embodiments, the control system 14 may include a controller 38 communicatively coupled to an analytics system 40, and a number of sensors 42. The analytics system 40 may receive data relating to one or more components of the gas turbine system 12 detected by the sensors 42, and generate and transmit outputs to the controller 38 based on an analysis of the data detected by the sensors 42. For example, as will be further appreciated, the analytics system 40 may use the sensor 42 data to determine, for example, $CO_2$ levels in the exhaust gas 36, pollutant (e.g., CO, $NO_x$, UHC, $SO_x$) levels in the exhaust gas 36, carbon content in the fuel 31, temperature of the fuel 31, temperature, pressure, clearance (e.g., distance between stationary and rotating components), flame temperature or intensity, vibration, compressor 20 discharge pressure (CDP), shaft 32 speed (e.g., TNH), generator power output (e.g., DWATT), combustor 22 combustion dynamics (e.g., fluctuations in pressure, flame intensity, and so forth), and load data from load 34. Also contained in the system are non-operational variables that may include individual part configuration.

In certain embodiments, the analytics system 40 may predict and model potential creep rupture of gas turbine or other industrial system components (e.g., turbine blades, stator blades, shaft, compressor, nozzles, burners, exhaust section and so forth). Indeed, as will be further appreciated with respect to FIGS. 2-5, for example, sensors 42 may be used to measure values such as temperature, pressure, and/or stress.

For example, in one embodiment, the sensed values may be used to determine thermal-induced stresses, mechanical stresses and/or creep stress by using physics-based models computational fluid dynamics (CFD) model, a thermal and/or structural finite element analysis (FEA) model, a parametric solid model, a non-parametric solid model, a 3-dimension to 2-dimension FEA mapping model, or a combination thereof. Statistical models such as a regression analysis model, a data mining model, or a combination thereof, may also be used to determine thermal-induced stresses, mechanical stresses and/or "creep" stress.

Additionally, in certain embodiments, the analytics system 40 may also calculate gas turbine system 12 design parameters, such as pressure vessel design parameters, e.g. design parameters, dimensions, construction details, heat balance equations, heat transfer equations, operational envelopes, and/or design envelopes associated with the gas turbine system 12 and the components of the gas turbine system 12 may be used in the models described herein for calculating and modeling gas turbine system 12 stress and "creep." In this way, the analytics system may predict the probability of potential gas turbine component creep ruptures expected before an outage, and thus outage planning (e.g., power plant outage planning and scheduling), predicting the manner in which the gas turbine may be operated a preventative maintenance activity, predicting the amount fall-out expected, improving repair planning and so forth.

Figure 2A:
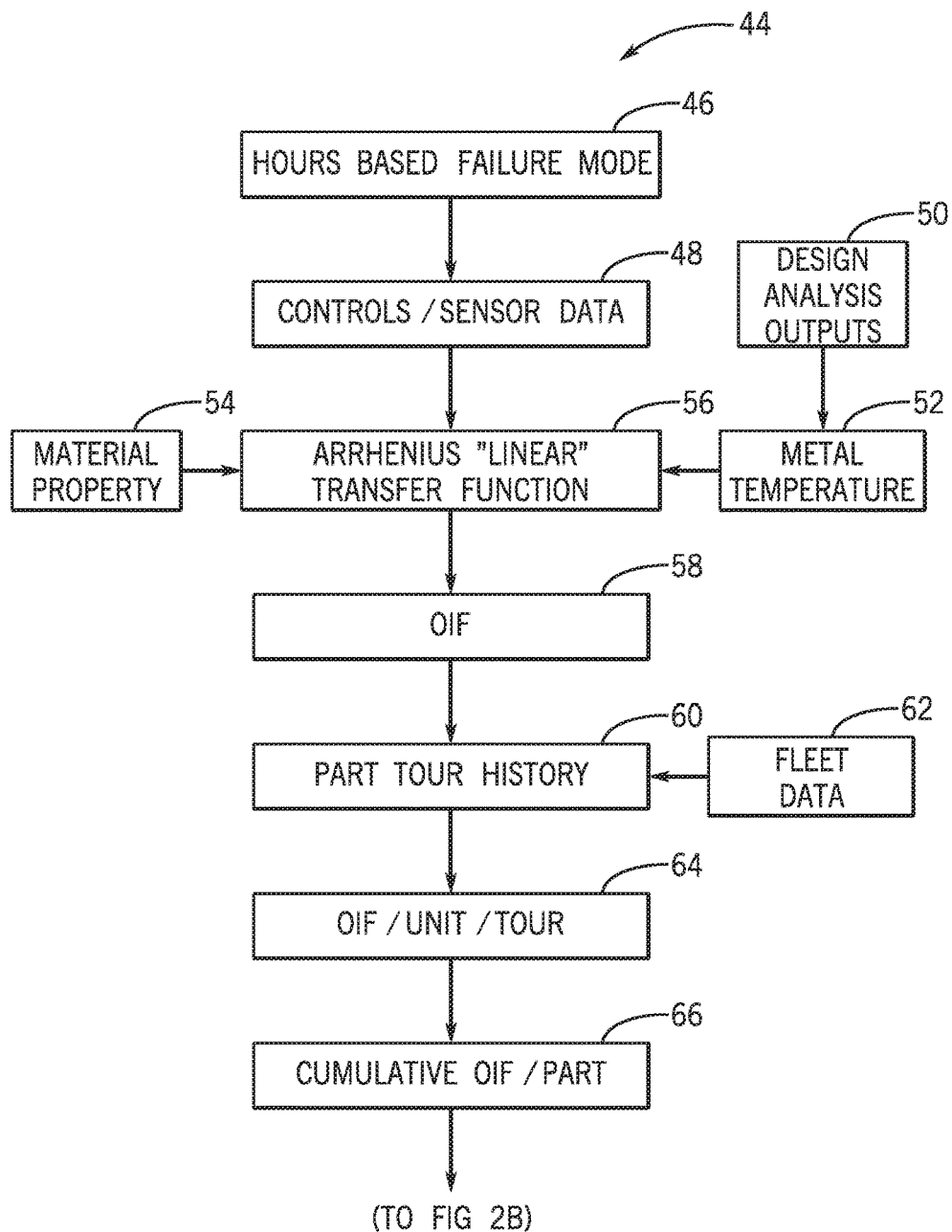
FIG. 2A is a flowchart illustrating an embodiment of a process useful in predicting and modeling potential creep ruptures of gas turbine components including an Arrhenius transfer function and operational impact factor (OIF) calculations, in accordance with an embodiment.

Turning now to FIG. 2, a flow diagram is presented, illustrating an embodiment of a process 44 useful in predicting and modeling potential creep ruptures of gas turbine components by using, for example, the analytics system 40 depicted in FIG. 1. The process 44 may include code or instructions stored in a non-transitory computer-readable medium (e.g., a memory or other storage device of the analytics system 40) and executed, for example, by the one or more processors included in the analytics system 40. The process 44 may begin with the analytics system 40 operating (block 46) in an hours-based creep rupture mode. For example, the analytics system 40 may derive and/or model operational data over a range of stress levels of various components (e.g., turbine blades, stator blades, shaft, compressor, nozzles, burners, exhaust section, valves, actuators, and so forth) of the gas turbine system 12 that may cause a potential creep rupture to occur from relatively shorter durations to longer durations (e.g., from over approximately 90 hours to over approximately 60,000 hours).

The process 44 may then continue with the analytics system 40 receiving and analyzing (block 48) controls (e.g., operator inputs) and/or sensor 42 inputs. The process 44 may then continue with the analytics system 40 calculating (block 50) one or more design outputs (e.g., component design outputs). For example, the analytics system 40 may receive or calculate, for example, the maximum and minimum operating temperature, pressure, or other physical characteristics (e.g., determined based on the engineering specification) for each component of the gas turbine system 12. The process 44 may then continue with the analytics system 40 deriving or modeling (block 52) temperature of the metal (e.g., $T_{Metal}$) of components of the gas turbine system 12 by some transfer function. For example, the analytics system 40 may derive and/or receive data at high temperature operating range not required of various components (e.g., turbine blades, stator blades, shaft, compressor, nozzles, burners, exhaust section, valves, actuators, and so forth) of the gas turbine system 12.

The process 44 may then continue with the analytics system 40 deriving or modeling (block 54) the "creep" material property of one or more components of the gas turbine system 12. For example, the analytics system 40 may derive and/or model progressive deformation (e.g., "creep") at constant stress to evaluate the physical materials of one or more components of the gas turbine system 12 under, for example, high temperatures (e.g., from approximately 900° F. to approximately 1100° F.) and a nominal to full load. The process 44 may then continue with the analytics system 40 deriving and/or calculating (block 56) an Arrhenius linear transfer function (e.g., equation for expressing secondary "creep," which may be expressed as a linear function of time and based on temperature and stress). For example, the analytics system 40 may derive and/or calculate the Arrhenius linear transfer function based on, for example, the temperature of the metal (e.g., $T_{Metal}$) of components and the "creep" material property.

The process 44 may then continue with the analytics system 40 deriving and/or calculating (block 58) an operational impact factor ("OIF") (e.g., a linear damage rate). Specifically, the analytics system 40 may convert the distribution of temperatures into a linear damage rate (e.g., "OIF") for specified time ranges based on, for example, the previously derived and modeled one or more transfer functions. In some embodiments, the analytics system 40 may provide the "OIF" value of the component of the gas turbine system 12 to the controller 38 to perform a control action based thereon.

The process 44 may then continue with the analytics system 40 receiving (block 60) a part (e.g., component of the gas turbine system 12) tour history, which may be based on received (block 62) fleet of gas turbine systems 12 data. The process 44 may then continue with the analytics system 40 may calculating and/or deriving (block 64) an "OIF" value per gas turbine system 12 per tour. The process 44 may then continue with the analytics system 40 may calculating and/or deriving (block 66) a cumulative "OIF" value per component (e.g., turbine blades, stator blades, shaft, compressor, nozzles, burners, exhaust section, valves, actuators, and so forth) of the gas turbine system 12.

Figure 2B:
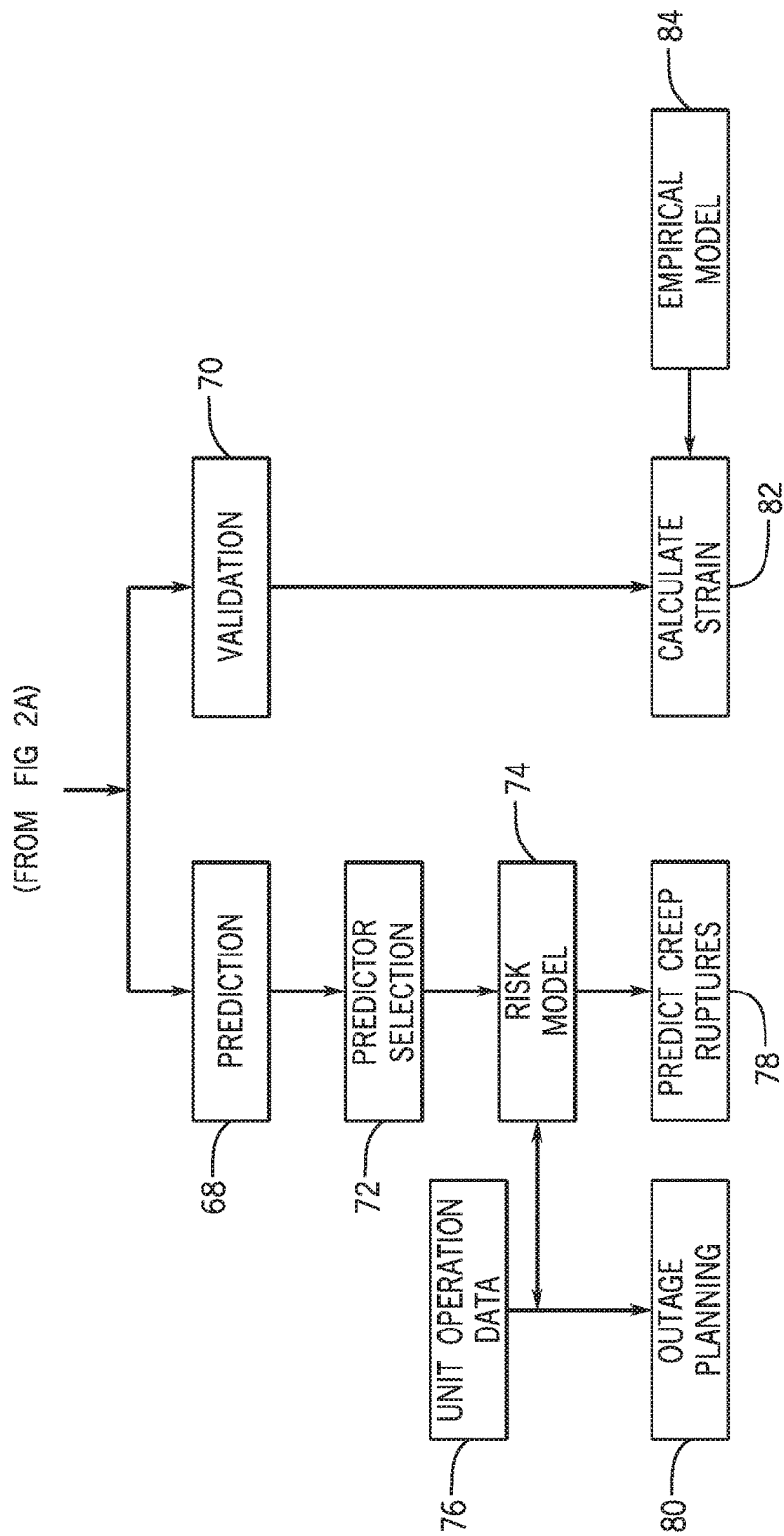
FIG. 2B is a flowchart illustrating the embodiment of the process of FIG. 2A useful in predicting and modeling potential creep ruptures of gas turbine components including outage planning and potential creep rupture prediction models, in accordance with an embodiment.

As illustrated by FIG. 2B, the process 44 may then continue with the analytics system 40 calculating a prediction model (block 68) and a validation (block 70) based on, for example, the cumulative "OIF" value per component. The process 44 may then continue with the analytics system 40 selecting (block 72) a set of one or more predictors. The process 44 may then continue with the analytics system 40 calculating and/or deriving (block 74) one or more risk-based models of a potential "creep" of one or more components of the gas turbine system 12. Based on received gas turbine system 12 operational data (e.g., sensor 42 data) (block 76), the process 44 may then continue with the analytics system 40 generating (block 80) an outage plan for the gas turbine system 12. Similarly, based on the one or more risk-based models (e.g., derived at block 74), the process 44 may then continue with the analytics system 40 predicting (block 78) a probability of potential creep rupture of one or more components (e.g., turbine blades, stator blades, shaft, compressor, nozzles, burners, exhaust section, valves, actuators, and so forth) of the gas turbine system 12.

As further illustrated by the process 44 via FIG. 2B, the process 44 the analytics system 40 may calculate (block 82) strain of the gas turbine system 12 and/or one or more components of the gas turbine system 12 based on, for example, empirical model (block 84) of the operational data of the gas turbine system 12 and/or one or more components of the gas turbine system 12. In this way, the analytics system may predict the probability of potential gas turbine component creep rupture expected before an outage, and thus outage planning (e.g., power plant outage planning and scheduling), predicting the manner in which a gas turbine may be operated for preventative maintenance activity, predicting the amount fall-out expected, improving repair planning and compliance, safety, and accountability (CSA) renegotiations, and so forth.

Figure 3:
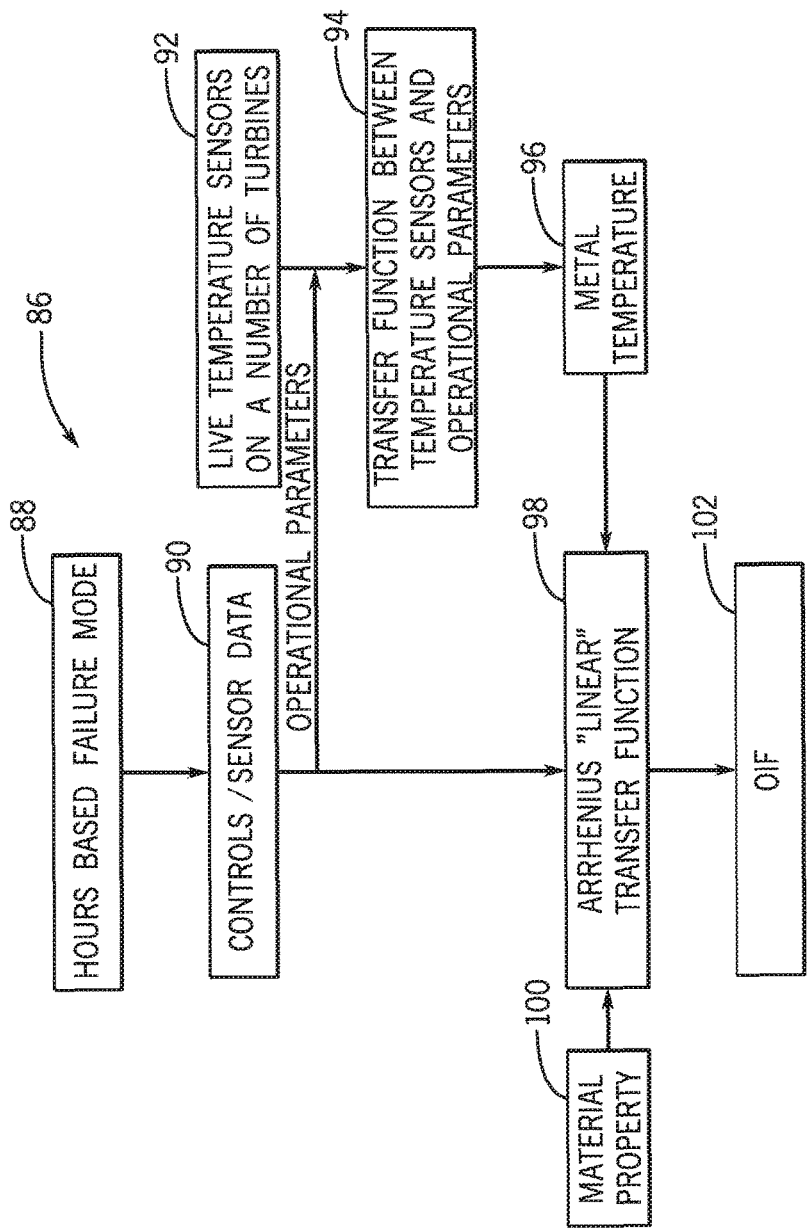
FIG. 3 is a flowchart illustrating another embodiment of a process useful in predicting and modeling potential creep ruptures of gas turbine components including component metal temperature data for a number of turbines, in accordance with an embodiment.

Turning now to FIG. 3, a flow diagram is presented, illustrating an embodiment of a process 86 useful in predicting and modeling potential creep ruptures of gas turbine components by using, for example, the analytics system 40 depicted in FIG. 1. The process 86 may include code or instructions stored in a non-transitory computer-readable medium (e.g., a memory or other storage device of the analytics system 40) and executed, for example, by the one or more processors included in the analytics system 40. The process 86 may begin with the analytics system 40 operating (block 88) in an hours-based creep rupture mode. The process 86 may then continue with the analytics system 40 receiving and analyzing (block 90) controls (e.g., operator inputs) and/or sensor 42 inputs.

The process 86 may then continue with the analytics system 40 receiving and/or calculating (block 92) online (e.g., real-time) temperature of the metal (e.g., $T_{Metal}$) of a number of turbine units (e.g., gas turbine system 12) by way of, for example, the sensors 42. The process 86 may then continue with the analytics system 40 calculating (block 94)

a transfer function based on the temperature of the metal (e.g., $T_{Metal}$) of the number of turbine units (e.g., calculated at block 92) and the gas turbine system operational parameters (e.g., received at block 90). Based on the calculated transfer function (e.g., calculated at block 94), the process 86 may then continue with the analytics system 40 deriving and/or calculating (block 96) a model of the metal temperature (e.g., $T_{Metal}$) of the number of gas turbine systems 12 and/or components of the gas turbine systems 12.

The process 86 may then continue with the analytics system 40 deriving or modeling (block 100) the "creep" material property of one or more components of the gas turbine system 12. The process 86 may then continue with the analytics system 40 deriving and/or calculating (block 98) an Arrhenius linear transfer function (e.g., equation for expressing secondary "creep," which may be expressed as a linear function of time and based on temperature and stress). For example, the analytics system 40 may derive and/or calculate the Arrhenius linear transfer function based on, for example, the metal temperature (e.g., $T_{Metal}$) of components and the "creep" material property. The process 86 may then continue with the analytics system 40 deriving and/or calculating (block 102) an operational impact factor ("OIF"). For example, the analytics system 40 may convert the metal temperature (e.g., $T_{Metal}$) into a linear damage rate (e.g., operation impact factor "OIF") of the gas turbine system 12, and, more specifically, one or more components of the gas turbine system 12.

Figure 4:
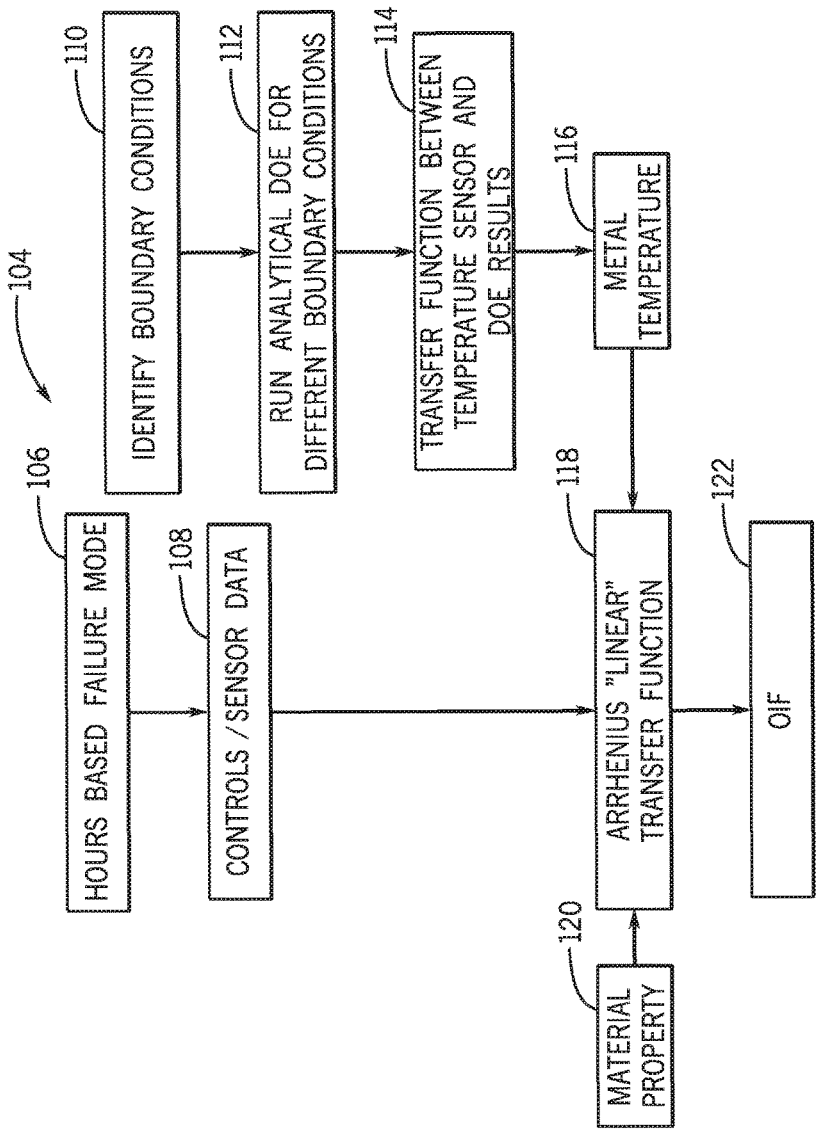
FIG. 4 is a flowchart illustrating another embodiment of a process useful in predicting and modeling potential creep ruptures of gas turbine components including boundary condition and design of experiments (DOE) calculations, in accordance with an embodiment.

Turning now to FIG. 4, a flow diagram is presented, illustrating an embodiment of a process 104 useful in predicting and modeling potential creep ruptures of gas turbine components by using, for example, the analytics system 40 depicted in FIG. 1. The process 104 may include code or instructions stored in a non-transitory computer-readable medium (e.g., a memory or other storage device of the analytics system 40) and executed, for example, by the one or more processors included in the analytics system 40. The process 104 may begin with the analytics system 40 operating (block 106) in an hours-based creep rupture mode. The process 104 may then continue with the analytics system 40 receiving and analyzing (block 108) controls (e.g., operator inputs) and/or sensor 42 inputs.

The process 104 may then continue with the analytics system 40 identifying one or more boundary conditions (block 110) based on the gas turbine system 12 operational data detected via the sensors 42 and/or provided via the controller 38. The process 104 may then continue with the analytics system 40 calculating and/or deriving (block 112) analytical design of experiments (DOE) for a number of different boundary conditions of the gas turbine system 12. Based on the calculated transfer function (e.g., calculated at block 114), the process 104 may then continue with the analytics system 40 deriving and/or calculating (block 116) a model of the metal temperature (e.g., $T_{Metal}$) of the number of gas turbine systems 12 and/or components of the gas turbine systems 12.

The process 104 may then continue with the analytics system 40 deriving or modeling (block 120) the "creep" material property of one or more components of the gas turbine system 12. The process 104 may then continue with the analytics system 40 deriving and/or calculating (block 118) an Arrhenius linear transfer function (e.g., equation for expressing secondary "creep," which may be expressed as a linear function of time and based on temperature and stress). For example, the analytics system 40 may derive and/or calculate the Arrhenius linear transfer function based on, for example, the metal temperature (e.g., $T_{Metal}$) of components and the "creep" material property. The process 104 may then continue with the analytics system 40 deriving and/or calculating (block 102) an operational impact factor ("OIF") (e.g., linear damage rate). For example, the analytics system 40 may convert the metal temperature (e.g., $T_{Metal}$) into a linear damage rate (e.g., operation impact factor "OIF") of the gas turbine system 12, and, more specifically, one or more components of the gas turbine system 12.

Figure 5:
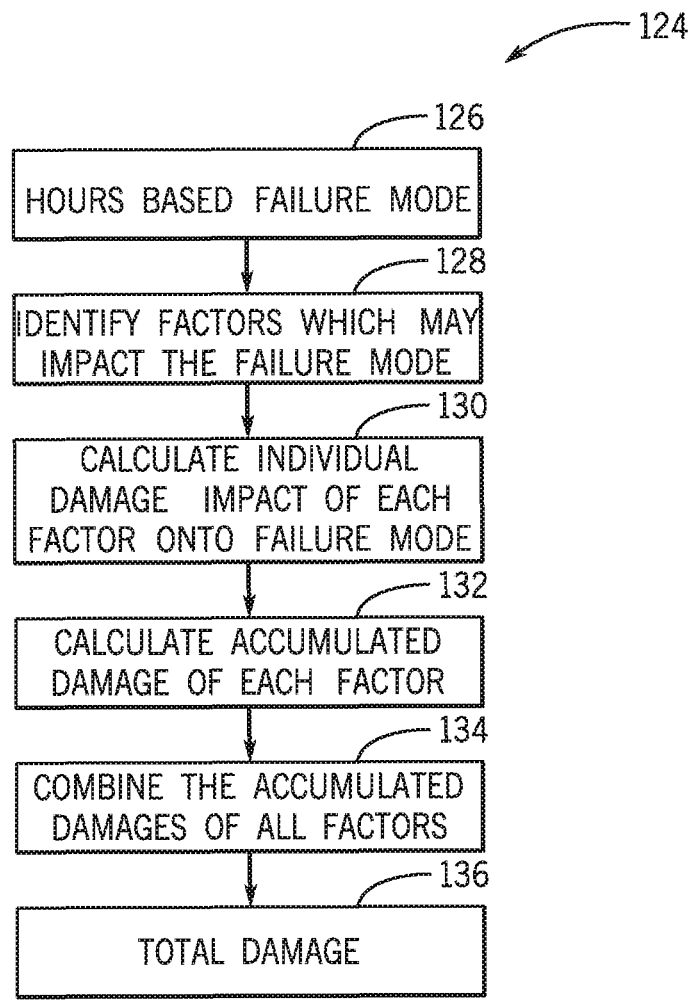
FIG. 5 is another flowchart illustrating another embodiment of a process useful in predicting and modeling potential creep ruptures of gas turbine components, in accordance with an embodiment.

Turning now to FIG. 5, another flow diagram is presented, illustrating an embodiment of a process 124 useful in predicting and modeling potential creep ruptures of gas turbine components by using, for example, the analytics system 40 depicted in FIG. 1. The process 124 may include code or instructions stored in a non-transitory computer-readable medium (e.g., a memory or other storage device of the analytics system 40) and executed, for example, by the one or more processors included in the analytics system 40. The process 124 may begin with the analytics system 40 operating (block 126) in an hours-based creep rupture mode. For example, the analytics system 40 may derive and/or model operational data over a range of stress levels of various components (e.g., turbine blades, stator blades, shaft, compressor, nozzles, burners, exhaust section, valves, actuators, and so forth) of the gas turbine system 12 that may cause a potential creep rupture to occur from relatively shorter durations to longer durations The process 124 may then continue with the analytics system 40 identifying (block 128) factors that may impact the creep rupture mode. For example, the analytics system 40 may derive or model, for example, the maximum and minimum operating temperature, pressure, or other physical characteristics (e.g., determined based on the engineering specification) for each component of the gas turbine system 12 with respect to the hours-based creep rupture mode and may adjust the operational time for which a potential creep rupture may occur. The process 124 may then continue with the analytics system 40 calculating (block 130) the individual damage impact of each factor on the hours-based creep rupture mode.

For example, the analytics system 40 may calculate and identify factors that may impact the hours-based creep rupture mode per component of the gas turbine system 12. The process 124 may then continue with the analytics system 40 calculating (block 132) the accumulated damage impact of each factor on the hours-based creep rupture mode. For example, the analytics system 40 may calculate and identify factors that may impact the hours-based creep rupture mode for all components of the gas turbine system 12. The process 124 may then continue with the analytics system 40 combining (block 134) the accumulated damages of all of the identified factors that may impact the hours-based creep rupture mode. The process 124 may then continue with the analytics system 40 calculating (block 136) the total damage of all components of the gas turbine system 12.

Turning now to FIG. 6, a flow diagram is presented, illustrating an embodiment of a process 138 useful in predicting and modeling potential creep ruptures of gas turbine components by using, for example, the analytics system 40 depicted in FIG. 1. The process 138 may include code or instructions stored in a non-transitory computer-readable medium (e.g., a memory or other storage device of the analytics system 40) and executed, for example, by the one or more processors included in the analytics system 40. The process 138 may begin with the analytics system 40 operating (block 140) in an hours-based creep rupture mode. The process 138 may then continue with the analytics system 40 receiving and analyzing (block 142) controls (e.g., operator inputs) via the controller 38.

The process 138 may then continue with the analytics system 40 receiving and/or calculating (block 144) online (e.g., real-time) temperature of the metal (e.g., $T_{Metal}$) for a number of turbine units (e.g., gas turbine system 12) by way of, for example, the sensors 42. The process 138 may then continue with the analytics system 40 deriving and/or calculating (block 146) a model of the metal temperature (e.g., $T_{Metal}$) of the number of gas turbine systems 12 and/or components of the gas turbine systems 12. The process 138 may then continue with the analytics system 40 deriving or modeling (block 150) the "creep" material property of one or more components of the gas turbine system 12. The process 138 may then continue with the analytics system 40 deriving and/or calculating (block 148) an Arrhenius linear transfer function. For example, the analytics system 40 may derive and/or calculate the Arrhenius linear transfer function based on, for example, the metal temperature (e.g., $T_{Metal}$) of components and the "creep" material property. The process 138 may then continue with the analytics system 40 deriving and/or calculating (block 152) an operational impact factor ("OIF"). For example, the analytics system 40 may convert the metal temperature (e.g., $T_{Metal}$) into a linear damage rate (e.g., operation impact factor "OIF") of the gas turbine system 12, and, more specifically, one or more components of the gas turbine system 12.

Turning now to FIG. 7, a flow diagram is presented, illustrating an embodiment of a process 154 useful in predicting and modeling potential creep rupture of gas turbine components by using, for example, the analytics system 40 depicted in FIG. 1. The process 154 may include code or instructions stored in a non-transitory computer-readable medium (e.g., a memory or other storage device of the analytics system 40) and executed, for example, by the one or more processors included in the analytics system 40. The process 154 may begin with the analytics system 40 receiving and analyzing (block 156) a fleet level DOE of operating parameters of a gas turbine system 12. The process 154 may then continue with the analytics system 40 deriving and/or calculating (block 158) a physics-based design analysis for at least one of the DOE points or values (e.g., a finite element analysis).

The process 154 may then continue with the analytics system 40 deriving and/or calculating (block 160) the metal temperature (e.g., $T_{Metal}$) for at least one of the DOE points or values. The process 154 may then continue with the analytics system 40 deriving and/or calculating (block 162) the metal temperature (e.g., $T_{Metal}$) for all of the DOE points or values. The process 154 may then continue with the analytics system 40 deriving or modeling (block 164) the "creep" material property of one or more components of the gas turbine system 12. The material property being (block 166) of an hours-based failure mode. The process 154 may then continue with the analytics system 40 calculating (block 168) the time at "x"% (e.g., some percentage value) of "creep" strain of one or more components of the gas turbine system 12 at various temperatures. The process 154 may then conclude with the analytics system 40 deriving and/or calculating (block 170) an operational impact factor ("OIF"). For example, the analytics system 40 may calculate the "OIF" as a ratio of hour-based time at International Organization for Standardization (ISO) conditions as compared the other gas turbines systems 12 and/or components of the gas turbine systems 12.

Technical effects of the present embodiments relate to systems and methods relate to an analytics system that may predict and model potential creep rupture of gas turbine or other industrial system components (e.g., turbine blades, stator blades, shaft, compressor, nozzles, burners, exhaust section and so forth). For example, the analytics system may model variations in gas turbine system operations reflected by distribution of temperatures converted into a linear damage rate or the operational impact factor ("OIF") for specified time ranges based on, for example, physics based model outputs and one or more transfer functions. In certain embodiments, the analytics system may calculate a factored run time for all the tours to compute cumulative damage at the component level. The analytics system may then associate damage with field creep rupture and non-creep ruptures to determine a statistical correlation. The analytics system may then utilize the statistical models to predict the potential creep rupture at any given time. In some embodiments, the generated damage approximation value may be used to identify, for example, a highly worked gas turbine system, and may drive the decision for preventative maintenance, outage planning, repair planning, and fallout predictions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
   a controller configured to control an operation of a turbine system; and
   an analytics system coupled to the controller and configured to:
   receive inputs corresponding to the operation of the turbine system;
   generate a linear damage rate value based at least in part on the inputs;
   generate a turbine system life prediction model configured to predict an operating life of one or more components of the turbine system based at least in part on the linear damage rate value; and
   provide the linear damage rate value to the controller to predict the operating life of the one or more components and to warn of a failure or potential failure of the one or more components.

2. The system of claim 1, wherein the turbine system life prediction model comprises a differential temperature model configured to model stress as a first function of a temperature difference over time, an differential pressure model configured to model stress as a second function of a pressure difference time, a differential flow model configured to model stress as a third function of a flow difference over time, or a combination thereof.

3. The system of claim 1, wherein the analytics system is configured to generate the turbine system life prediction model based at least in part on a stress approximation of the one or more components.

4. The system of claim 3, wherein the stress approximation comprises a thermal stress approximation, a creep stress approximation, a mechanical stress approximation, or a combination thereof, of the one or more components.

5. The system of claim 1, wherein the analytics system is configured to generate a statistical model, a physics-based model, a knowledge-based model, or a combination thereof, as the turbine system life prediction model.

6. The system of claim 1, wherein the analytics system is configured to generate the linear damage rate value based at least in part on a gas turbine physics-based operational model and a transfer function of a temperature or a stress of the one or more components.

7. The system of claim 1, wherein the analytics system is configured to generate the linear damage rate value based at least in part on a creep material property of the one or more components.

8. The system of claim 1, wherein the analytics system is configured to predict the operating life of the one or more components based on the linear damage rate value to predict a probability of a potential turbine system component creep rupture before an outage.

9. A non-transitory computer-readable medium having computer executable code stored thereon, the code comprising instructions to:
cause an analytics system to receive inputs corresponding to an operation of the turbine system;
cause the analytics system generate linear damage rate value based at least in part on the inputs, wherein the linear damage rate value comprises a linear damage rate value;
cause the analytics system generate a turbine system life prediction model configured to predict an operating life of one or more components of the turbine system based at least in part on linear damage rate value; and
provide the linear damage rate value to a controller to predict the operating life of the one or more components and to warn of a failure or potential failure of the one or more components.

10. The non-transitory computer-readable medium of claim 9, wherein the code comprises instructions to cause the analytics system to generate the turbine system life prediction model based at least in part on a stress approximation of the one or more components.

11. The non-transitory computer-readable medium of claim 10, wherein the stress approximation comprises a thermal stress approximation, a creep stress approximation, a mechanical stress approximation, or a combination thereof, of the one or more components.

12. The non-transitory computer-readable medium of claim 9, wherein the code comprises instructions to cause the analytics system to generate a statistical model, a physics-based model, a knowledge-based model, or a combination thereof, as the turbine system life prediction model.

13. The non-transitory computer-readable medium of claim 12, wherein the code comprises instructions to cause the analytics system to generate the linear damage rate value based at least in part on a gas turbine physics-based operational model and a transfer function of a temperature or a stress of the one or more components.

14. The non-transitory computer-readable medium of claim 9, wherein the code comprises instructions to cause the analytics system to generate the linear damage rate value based at least in part on a creep material property of the one or more components.

15. The non-transitory computer-readable medium of claim 9, wherein the code comprises instructions to cause the analytics system to predict the operating life of the one or more components based on the linear damage rate value to predict a probability of a potential turbine system component creep rupture before an outage.

16. A system comprising:
a data analytics system configured to generate a physics-based gas turbine system life prediction model based at least in part on a physics-based design of experiment (DOE) analysis parameter as a first input and a time of creep strain value calculated at one or more operating temperatures associated with an operation of a gas turbine system as a second input, wherein the physics-based gas turbine system life prediction model is configured to predict an operating life of a component of the gas turbine system, wherein the life prediction model provides an input to a controller, and wherein the controller applies the input to derive a control action for the gas turbine system, to predict the operating life of the one or more components, and to warn of a failure or potential failure of the one or more components.

17. The system of claim 16, wherein the data analytics system is configured to generate the physics-based gas turbine system life prediction model based at least in part on a creep material property of the component.

18. The system of claim 16, wherein the component comprises a turbine blade, a stator blade, a shaft, a compressor, a nozzle, a burner, an exhaust section, a valve, an actuators, or some combination thereof.

* * * * *